US008545303B2

(12) United States Patent
Nelson et al.

(10) Patent No.: US 8,545,303 B2

(45) Date of Patent: Oct. 1, 2013

(54) WAGERING GAME AND METHOD WITH A RANDOMLY-SELECTED FEATURE GAME

(75) Inventors: Loren T. Nelson, Reno, NV (US); Michael DePalma, Reno, NV (US); Ryan Leach, Reno, NV (US); Dougal Austin, Reno, NV (US)

(73) Assignee: Bally Gaming, Inc., Las Vegas, NV (US)

(*) Notice: Subject to any disclaimer, the term of this patent is extended or adjusted under 35 U.S.C. 154(b) by 859 days.

(21) Appl. No.: 12/102,586

(22) Filed: Apr. 14, 2008

(65) Prior Publication Data

US 2009/0124367 A1 May 14, 2009

Related U.S. Application Data

(60) Provisional application No. 60/987,390, filed on Nov. 12, 2007.

(51) Int. Cl.
*A63F 13/00* (2006.01)

(52) U.S. Cl.
USPC .................. 463/16; 463/17; 463/18; 463/19; 463/20; 463/25; 463/26; 463/27

(58) Field of Classification Search
USPC .......................................... 463/16–20, 25–27
See application file for complete search history.

(56) References Cited

U.S. PATENT DOCUMENTS 5,885,158 A * 3/1999 Torango et al. ................. 463/27
6,565,436 B1 * 5/2003 Baerlocher ..................... 463/26
6,652,378 B2 * 11/2003 Cannon et al. .................. 463/20
7,131,908 B2 * 11/2006 Baerlocher ..................... 463/20
7,144,321 B2 * 12/2006 Mayeroff ........................ 463/16
7,235,011 B2 * 6/2007 Randall et al. .................. 463/25
7,278,919 B2 * 10/2007 Souza et al. .................... 463/25
7,326,115 B2 * 2/2008 Baerlocher ..................... 463/25
7,344,444 B2 * 3/2008 Suzuki ............................ 463/36
7,677,971 B2 * 3/2010 Baerlocher et al. ............. 463/27
2002/0086728 A1 7/2002 Bennett
2003/0092476 A1 * 5/2003 Fox ................................ 463/13
2004/0048649 A1 * 3/2004 Peterson et al. ................ 463/20
2005/0049034 A1 * 3/2005 Kojima ........................... 463/20
2005/0054419 A1 3/2005 Sousa et al.
2006/0148548 A1 7/2006 Hornik et al.
2008/0132309 A1 6/2008 Baumgartner
2008/0214292 A1 9/2008 Bryant

* cited by examiner

*Primary Examiner* — Dmitry Suhol
*Assistant Examiner* — David Duffy
(74) *Attorney, Agent, or Firm* — Marvin Hein

(57) ABSTRACT

Wagering games, gaming machines, networked gaming systems and associated methods are disclosed that include a randomly selected feature game. One disclosed aspect provides for a wagering game including a primary game and a plurality of feature games. One or more of the plurality of feature games is selected for play upon a triggering event associated with the primary game. In another disclosed aspect, the wagering game may also include at least two types of progressives including wide-area progressives, casino-wide progressives, bank progressives and stand-alone progressives. Another disclosed aspect provides a pay table, wherein the pay table changes dynamically according to the size of a wager.

17 Claims, 7 Drawing Sheets

WAGERING GAME AND METHOD WITH A RANDOMLY-SELECTED FEATURE GAME

RELATED APPLICATIONS

This application claims priority from U.S. provisional patent application 60/987,390 filed on Nov. 12, 2007.

This application is also related to U.S. co-pending patent application Ser. No. 12/102,603, entitled "GAMING MACHINE AND METHOD WITH A RANDOMLY SELECTED FEATURE GAME," filed on Apr. 14, 2008 which claims priority from provisional application 60/987,390 filed on Nov. 12, 2007.

This application is also related to U.S. patent application Ser. No. 12/102,620 entitled "NETWORKED GAMING SYSTEMS AND METHOD WITH A RANDOMLY SELECTED FEATURE GAME," filed on Apr. 14, 2008, now abandoned, which claimed priority from provisional application 60/987,390 filed on Nov. 12, 2007.

All of the above referenced applications are hereby incorporated by reference in their entireties for all purposes.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention is directed to wagering games and, more particularly, to wagering games and methods with a randomly selected feature game.

2. Description of the Related Art

In the prior art, various types of gaming machines have been developed with different features to captivate and maintain player interest. In general, a gaming machine allows a player to play a game in exchange for a wager. Depending on the outcome of the game, the player may be entitled to an award which is paid to the player by the gaming machine, normally in the form of currency or game credits. Gaming machines may include flashing displays, lighted displays, or sound effects to capture a player's interest in a gaming device.

Another important feature of maintaining player interest in a gaming machine includes providing the player with many opportunities to win awards, such as cash or prizes. For example, in some slot machines, the display windows show more than one adjacent symbol on each reel, thereby allowing for multiple-line betting. Some gaming machines offer a player the opportunity to win millions of dollars by providing progressive jackpots. Additionally, feature games of various types have been employed to reward players above the amounts normally awarded on a standard game pay schedule. Generally, such feature games are triggered by predetermined events such as one or more appearances of certain combinations of indicia in a primary game. In order to stimulate interest, feature games are typically set to occur at a gaming machine on a statistical cycle based upon the number of primary game plays.

These and other examples in the prior art have been described to provide a player with more excitement. There continues to be a need for more innovative games and gaming machines to stimulate and excite players.

SUMMARY OF THE INVENTION

In accordance with one or more embodiments of the invention, a wagering game includes a primary game and a plurality of feature games. One or more of the plurality of feature games is randomly selected for play upon a triggering event associated with the primary game.

In accordance with one or more other embodiments, the wagering game may include a wager, wherein an award payable to a player of the game is scaled according to the wager. In one or more embodiments, the amount of the wager may influence which of the plurality of feature games is selected for play and/or the number of time each selected feature game is played. In still other embodiments, the wagering game also includes a pay table, wherein the pay table changes dynamically according to the size of the wager.

In accordance with still other embodiments, the wagering game may include at least one of a wide-area progressive, casino-wide progressive, bank progressive, stand-alone progressive or a combination thereof. Other features and advantages will become apparent from the following detailed description, taken in conjunction with the accompanying drawings, which illustrate by way of example, the features of the various embodiments.

DETAILED DESCRIPTION OF THE INVENTION

Figure 1:
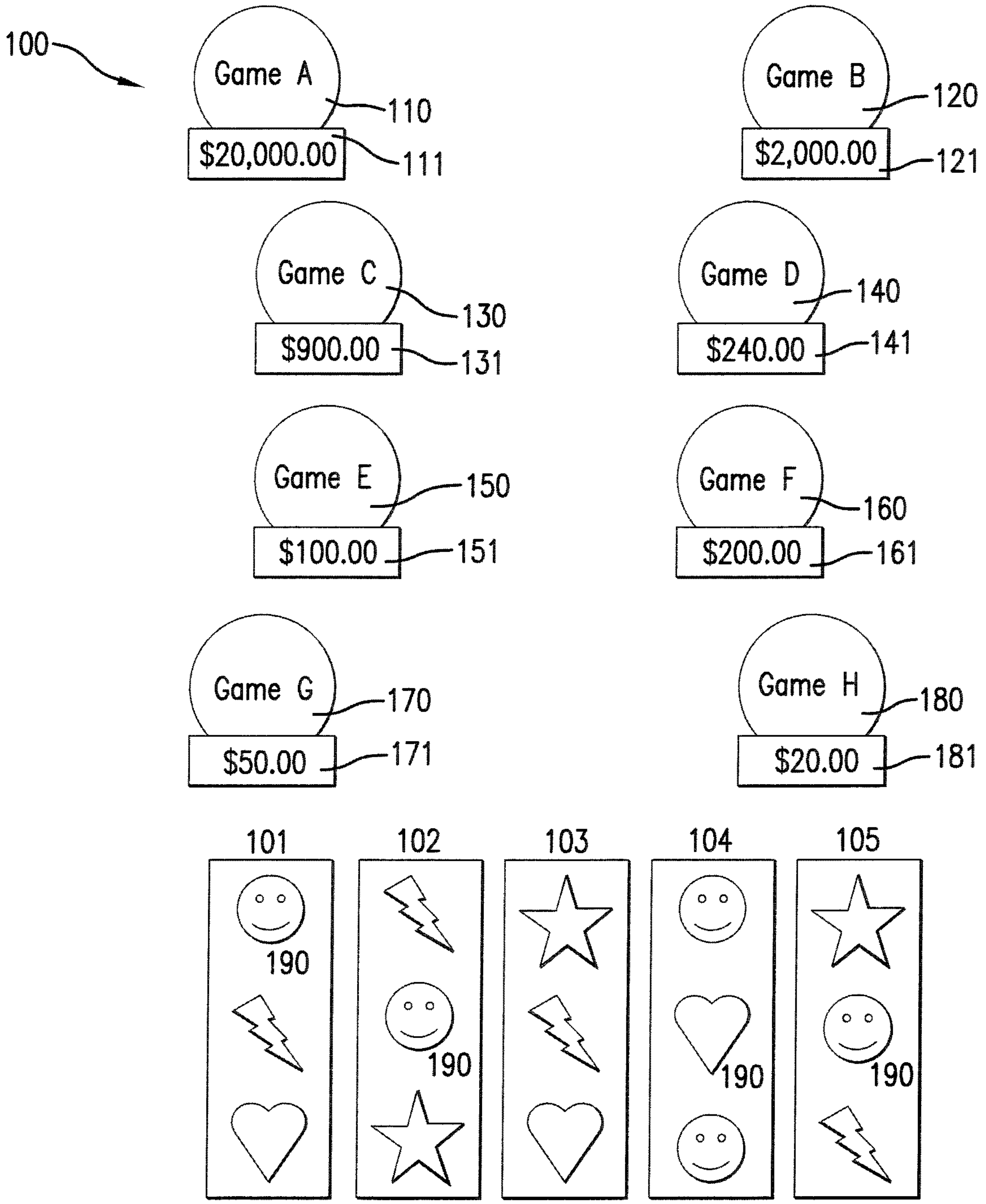
FIG. 1 illustrates an example game in accordance with one or more embodiments of the invention.

Various embodiments are directed to games, gaming machines, gaming systems and associated methods. In accordance with one or more embodiments of the invention, a gaming machine has a primary game and one or more feature games. Within the primary game, at least one primary game outcome will initiate a feature game. In one or more embodiments, which feature games are played is randomly chosen by a control program or an external controller each time a feature play is triggered. Embodiments of the invention are illustrated and described herein, by way of example only, and not by way of limitation. Referring now to the drawings, and more particularly to FIGS. 1-7, there are shown illustrative examples of games, gaming machines, networked gaming systems and associated methods in accordance with various aspects of the invention.

Referring to FIG. 1, in accordance with one aspect of the invention, an example slot machine game 100 is implemented using five spinning reels 101-105. Each of 20 pay line patterns (not shown) passes through one indicium on each of the five reels 101-105. The number of pay lines and associated pay line patterns are by way of example only and may vary. The player selects the number of played pay lines and the number of credits or coins wagered on each line using slot machine controls such as touch screen or electromechanical control buttons. The player may also collect the balance of his credits by pressing a collect button.

A credit meter may display the player's current credit balance, while other meters may display, for example, the number of credits or coins wagered and the last amount paid by a payout mechanism. Other meters containing other information may be displayed. The amount wagered on each pay line may additionally be indicated in a bet tag (not shown) corresponding to each pay line.

The player initiates game play by pressing a button, pulling a lever, etc. In some embodiments, the player may simultaneously select all pay lines at the maximum number of coins or credits allowed per line by pressing a MAX BET button. Touchscreen buttons (not shown) may be used to perform the actions described here without deviating from the scope of the invention. Reels 101-105 are made to spin and stop in predetermined stop positions and then indicate whether the stop positions of the reels resulted in a winning game outcome.

In various embodiments, winning combinations may be evaluated across adjacent reels from left-to-right, from right-to-left or both. Additional winning combinations may be awarded when certain indicia do not necessarily accumulate adjacently on a pay line, but rather, appear anywhere on the reels (i.e., "scatter pays"). In addition, "wild" indicia may be used to complete winning combinations. Some "wild" indicia may also cause completed winning combinations to be result in pay amounts in excess of the normal winning combination by way of multiplication or addition, for example, a wild doubler symbol may be used.

Various primary game outcomes may be utilized to trigger the play of a feature game, including, but not limited to, awarding bonus play when certain symbols appear on a pay line, when certain symbols are scattered, when no symbols of a certain type appear, when a certain winning combination occurs or, regardless of the visible symbols, at random or fixed intervals. The availability of the feature game may be restricted based on the size of the wager. In accordance with one or more embodiments of the invention, the feature game may be a randomly selected one of a set of feature games 110, 120, 130, 140, 150, 160, 170 and 180. In one or more embodiments, various factors may influence the random selection such as amount wagered, rate of play, player tracking status, or other such variables or combinations thereof. The probabilities associated with randomly selecting each specific feature game may vary from one feature game to the next and do not necessarily have to have equal probability.

In accordance with one or more embodiments, two or more feature games may be played as a result of a single triggering event in the primary game. If two or more feature games are played, the order in which the feature games are played may be in the order shown on the gaming machine's display device, in the order the feature games were randomly selected, in the order of potential award value, or the order may be randomly selected by the control program or external controller. The number of times each feature game is played as a result of the triggering event may be limited to one time each, may be defined within the control program, may be determined randomly by the control program, or may be determined by an external controller. Other factors may influence this selection such as the amount wagered, rate of play, player tracking status, or other such variables or combinations thereof.

In one embodiment, a gaming machine has a primary game comprised of a slot-based game of five spinning reels 101-105 and one or more feature games comprised of a miniature slot-based game of three spinning reels each. Examples of these types of games are disclosed in U.S. application Ser. No. 11/233,923, entitled "Embedded Reel Games with Progressives," filed on Sep. 22, 2005, which is hereby incorporated by reference in its entirety for all purposes. Within the primary game, one of the slot symbols is designated as the initiating symbol for the bonus game whenever the primary game outcome visibly contains a minimum number of these triggering symbols. Whenever the minimum number of these slot symbols is visible, a like number of the feature games will be played one or more times. The selection of which feature games that will be played in any individual feature round are randomly chosen by the control program each time the feature is initiated. The order in which the feature games are played is in the order shown on the display device. In the example of FIG. 1, the initiating symbol is the smiley-face 190. As the example shows, there are five smiley-faces 190 visible. Therefore, five feature games from the choices of eight games, 110, 120, 130, 140, 150, 160, 170 and 180 (Games A through H), each having a potential progressive prize 111, 121, 131, 141, 151, 161, 171 and 181, will be randomly selected by the control program for the player to play. In accordance with one or more aspects of the invention, each progressive 111, 121, 131, 141, 151, 161, 171 and 181 may be simultaneously operatively connected to one or more types of progressive controller.

Figure 2:
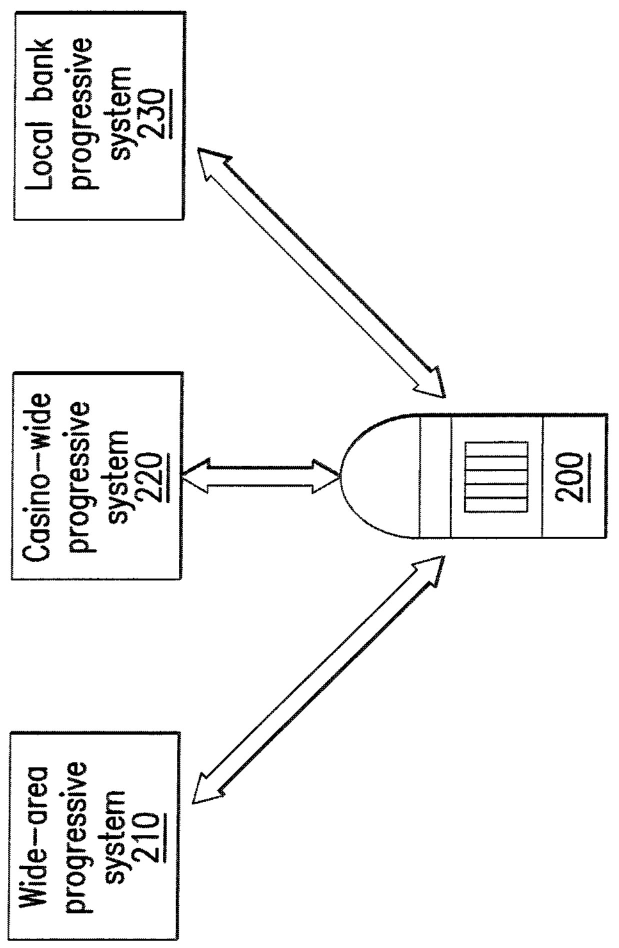
FIG. 2 is an example schematic block diagram showing the hardware elements of a multi-type progressive gaming system in accordance with one or more aspects of the present invention.

Referring to FIG. 2, in accordance with one or more embodiments of the invention, a slot machine 200 may be connected to a plurality of progressive controllers or progressive systems including wide-area progressive systems 210, casino-wide progressive systems 220 and a local bank progressive system 230. A wide-area progressive system 210, such as the MAPS system by Bally Technologies, may encompass a large number of gaming machines across an entire state, region or set of regions and will generally offer the highest value progressive jackpots, typically in the millions of dollars. A casino-wide progressive system 220 may be local to a specific property and have several connected gaming machines and offer progressive jackpots in the thousands of dollars. Still other progressive systems, such as a local bank progressive system 230, are much smaller and typically link a bank of gaming machines together for a progressive jackpot in the hundreds of dollars. Local bank progressive systems 220 may be connected to a known industry-standard progressive controller (not shown) such as a controller manufactured by Mikohn, Inc. The progressive controller monitors wagering during regular play at each of the gaming machines connected to the controller, calculates a current value for one or more progressive jackpot pools and transmits the current pool values to the gaming machines. In one or more embodiments, progressive awards are accumulated during regular play as a percentage, such as three percent, of the regular game play take. The prizes may be sized according to the preferences of the casino operator. The number of prizes may vary without deviating from the scope of the invention. The size of the prizes is dependent on the amount of play prior to initiating feature game play. In another aspect, the prizes may be set amounts established by the casino operator from non-coin-in funds, such as marketing funds. The smallest of the progressive systems are a single gaming machine which manages its own progressive jackpot, typically in the tens of dollars. In one or more embodiments, one or more of the various types of progressives may also be operated by a player tracking host computer or a server on a network connected to the various slot machines.

Winning game outcomes may be indicated on a pay table. The pay table may be accessible through a help button. In alternate embodiments, the pay table may be presented on a video or printed display attached to the gaming device. A winning combination, for example, could be three or more dollar sign symbols adjacent to one another on an active pay line. For each winning combination, the game device awards the player the award in the pay table, adjusted as necessary based on the number of credits wagered on the pay line on which the win occurred.

In accordance with one or more embodiments of the invention, a slot-based gaming device continually displays all payout information to the player. All payout information is interactively updated responding to changes in the player's bet and the current results of the game outcome. A portion of the display device is reserved for an area detailing the current results of a game outcome and an area for detailing possible winning combinations.

Figure 3:
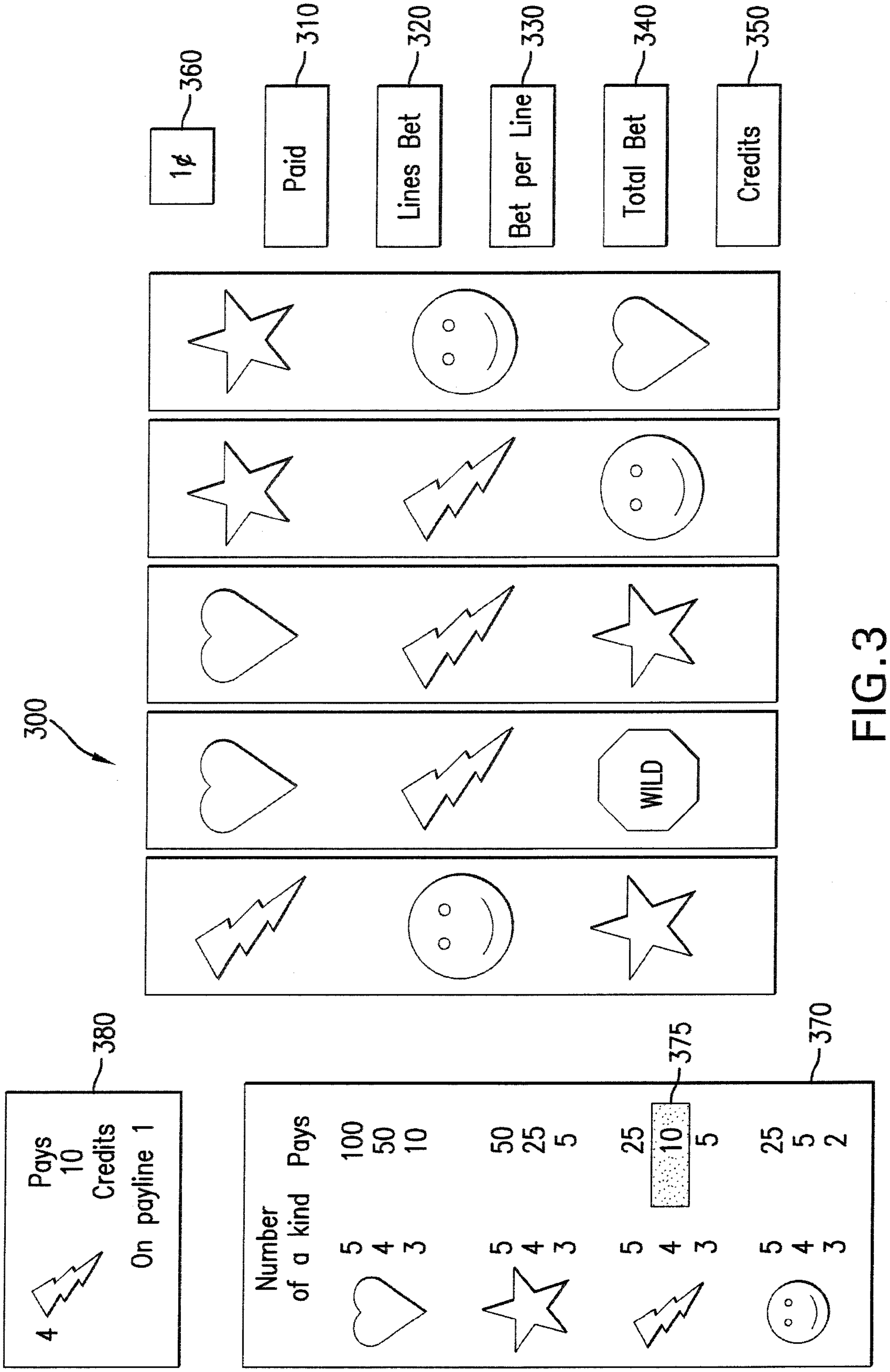
FIG. 3 illustrates an example game screen in accordance with one or more embodiments of the invention.

Referring to FIG. 3, an example game display 300 in accordance with one or more embodiments of the invention may include five reels 301-305 and a number of game meters including a win paid meter 310, lines bet meter 320, bet per line meter 330, total bet meter 340 and credit meter 350. The current denomination 360 for the game may also be displayed.

Pay table 370 may graphically show, in explicit detail, each possible winning combination for the game. The pay table 370 depicts each symbol, the number of symbols required for a winning combination, and the amount of the award of the winning combination. As the player increases or decreases the bet amount, the award amount for each combination is automatically adjusted relative to the new bet amount.

Win description area 360 graphically shows any winning combinations resulting from game play. When there are multiple winning pay lines, the winning combinations are cycled in area 310, one at a time. Area 310 depicts the symbol involved, how many symbols were involved, the amount of the award, and on which pay line the winning combination occurred. In the example shown, 4 lightning bolts appearing on pay line 1 pays 10 credits. In one or more embodiments, the corresponding pay 375 may be highlighted in pay table 370.

Figure 4:
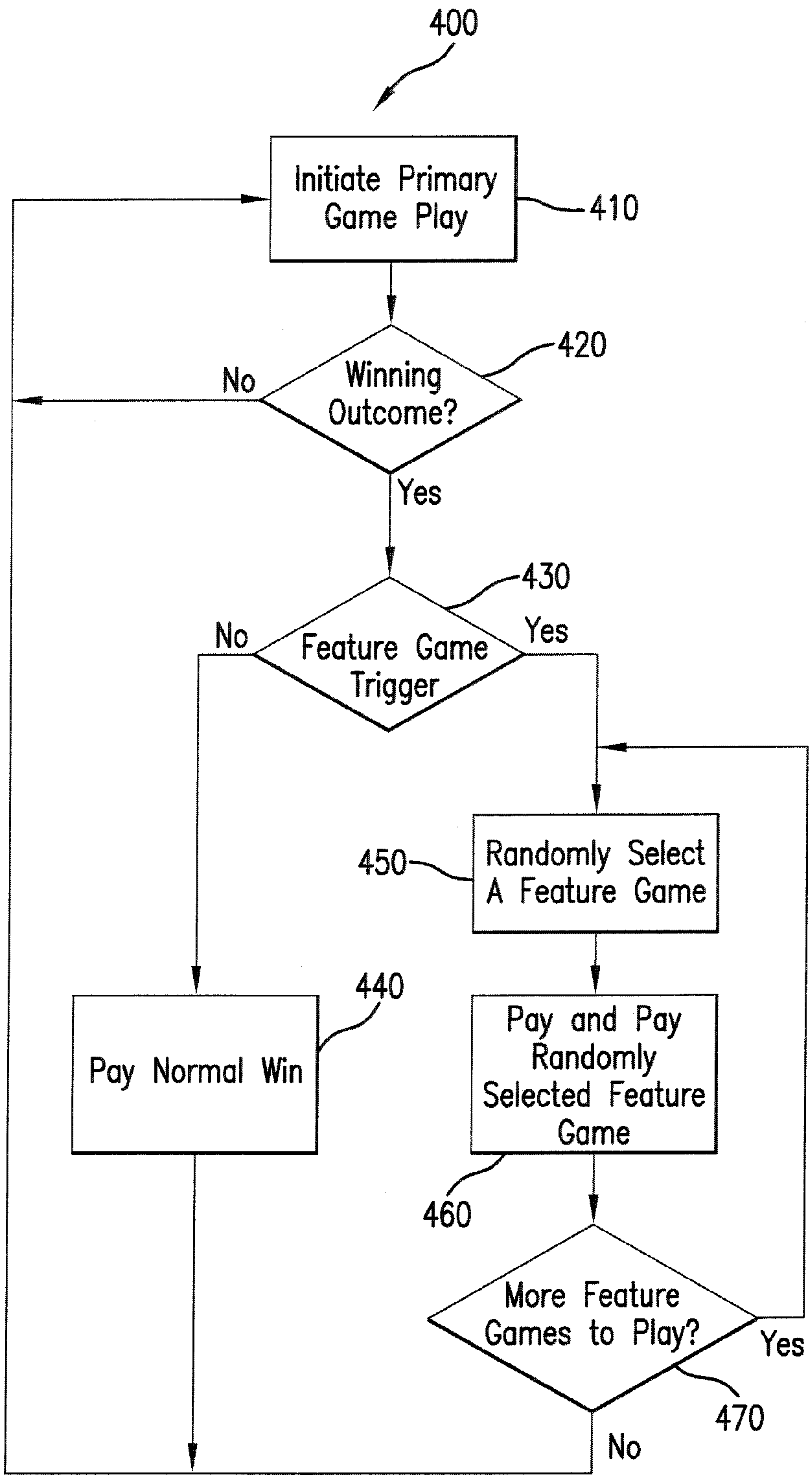
FIG. 4 is an example functional block diagram depicting the steps associated with carrying out a method in accordance of one or more aspects of the invention.

A logical flow diagram generally depicting the steps associated with an example method 400 for carrying out a game in accordance with one aspect of the invention is presented in FIG. 4. In one example implementation, a gaming program executable on a gaming processor may be prepared in accordance with conventional programming techniques and software to produce the desired affect as described by the blocks and flow paths in the flow diagram below. In another example implementation, the desired effect as described by the flow diagram below may be produced by utilizing an electromechanical apparatus, such as one using spinning reels together with an LCD top box display which may be implemented together with a random number generator configured in accordance with conventional mathematical modelling methods. The order of actions as shown in FIG. 4 and described below is only illustrative, and should not be considered limiting. For example, the order of the actions may be changed, additional steps may be added or some steps may be removed without deviating from the scope and spirit of the invention.

First at block 410, a player places a wager and starts the game, whereby, for example, each reel then spins or displays a representation of a slot machine reel spin before stopping with a combination of indicia displayed to the player. Flow continues at block 420, where the indicia displayed on the reels are examined to determine whether any winning outcomes occurred. If not, flow returns to block 410 for play of another primary game.

If a winning outcome was determined at block 430, it is further determined if a feature trigger has occurred. If not, the player is paid for a normal win at block 440 and flow returns to block 410 for play of another primary game.

If a feature game trigger was determined at block 430, one of a set of feature games is randomly selected for play at block 450. Various factors may influence the random selection such as amount wagered, rate of play, player tracking status, or other such variables or combinations thereof. The probabilities associated with randomly selecting each specific feature game may vary from one feature game to the next and do not necessarily have to have equal probability.

At block 460, the selected feature game is presented for play and, if a winning outcome occurs, the player is paid accordingly. The number of times the selected feature game in played as a result of the triggering event may be limited to one time, may be defined within the game program, may be determined randomly by the game program, or may be determined by an external controller. Other factors may influence this selection such as amount wagered, rate of play, player tracking status, or other such variables of combinations thereof.

In accordance with one or more embodiments, two or more feature games may be played as the result of a single triggering event in the primary game. Accordingly, at block 470, a determination is made to determine whether another feature game should be played. If not, flow returns to block 410 for play of another primary game.

If a determination is made at block 470 that another feature game is to be played, control returns to block 450 for selection of another feature game. If two or more feature games are played as a result of a feature game trigger, the order in which the feature games are played may be in the order shown on the gaming machine's display device, in the order the feature games were randomly selected, in the order of potential award value, or the order may be randomly selected by the control program or an external controller.

Figure 5:
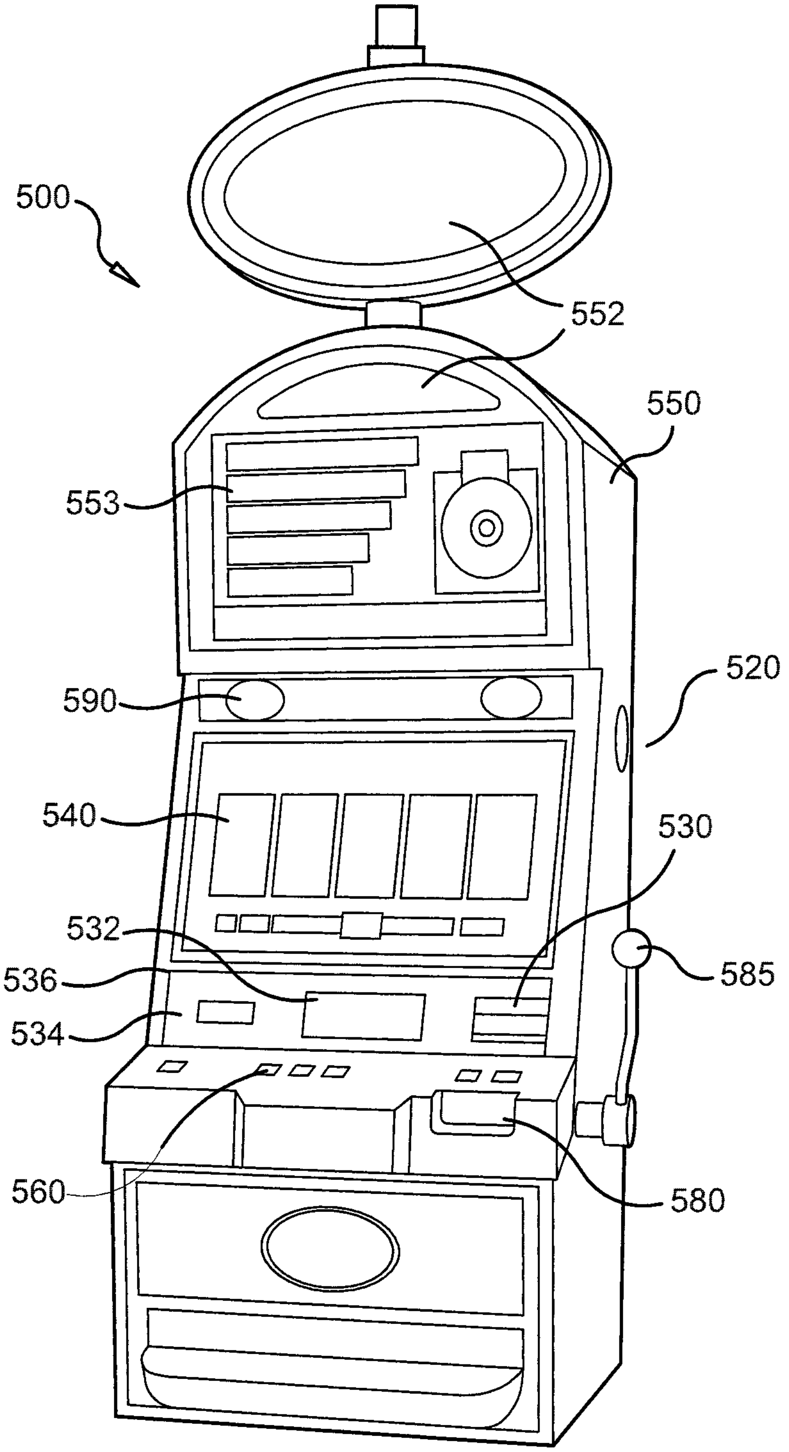
FIG. 5 is a perspective view of an example gaming machine in accordance with one aspect of the present invention.

Referring to FIG. 5, an example gaming machine 500 is shown including cabinet housing 520, primary game display 540, player-activated buttons 560, player tracking panel 536, bill/voucher acceptor 580 and one or more speakers 590. Cabinet housing 520 is a self-standing unit that is generally rectangular in shape and may be manufactured with reinforced steel or other rigid materials which are resistant to tampering and vandalism. Cabinet housing 520 houses a processor, circuitry, and software (not shown) for receiving signals from the player-activated buttons 560, operating the games, and transmitting signals to the respective displays and speakers. Any shaped cabinet may be implemented with any embodiment of gaming machine 500 so long as it provides access to a player for playing a game. For example, cabinet 520 may comprise a slant-top, bar-top, or table-top style cabinet. The operation of gaming machine 500 is described more fully below.

The plurality of player-activated buttons 560 may be used for various functions such as, but not limited to, selecting a wager denomination, selecting a game to be played, selecting a wager amount per game, initiating a game, or cashing out money from gaming machine 500. Buttons 560 function as input mechanisms and may include mechanical buttons, electromechanical buttons or touch screen buttons. Optionally, a handle (not shown) may be rotated by a player to initiate a game.

In other embodiments, buttons 560 may be replaced with various other input mechanisms known in the art such as, but not limited to, a touch screen system, touch pad, track ball, mouse, switches, toggle switches, or other input means used to accept player input. For example, one input means is a universal button module as disclosed in U.S. application Ser. No. 11/106,212, entitled "Universal Button Module," filed on Apr. 14, 2005, which is hereby incorporated by reference. Generally, the universal button module provides a dynamic button system adaptable for use with various games and capable of adjusting to gaming systems having frequent game changes. More particularly, the universal button module may be used in connection with playing a game on a gaming machine and may be used for such functions as selecting the number of credits to bet per hand.

Player tracking panel 536 includes player tracking card reader 534 and player tracking display 532. Voucher printer 530 may be integrated into player tracking panel 536 or installed elsewhere in cabinet housing 520 or top box 550.

Game display 540 presents a game of chance wherein a player receives one or more outcomes from a set of potential outcomes. For example, one such game of chance is a video slot machine game. In other aspects of the invention, gaming machine 500 may present a mechanical reel slot machine, a video keno game, a lottery game, a bingo game, a Class II bingo game, a roulette game, a craps game, a blackjack game, a mechanical or video representation of a wheel game or the like. In alternative embodiments, it may further be appreciated that games of skill or games of chance involving some player skill may be implemented with gaming machine 500.

Cabinet housing 520 includes top box 550 which contains "top glass" 552 comprising advertising or payout information related to the game or games available on gaming machine 500. Mechanical or video/mechanical embodiments may include game displays such as mechanical reels, wheels, or dice as required to present the game to the player. In video/mechanical or pure video embodiments, game display 540 is, typically, a CRT or a flat-panel display in the form of, but not limited to, liquid crystal, plasma, electroluminescent, vacuum fluorescent, field emission, or any other type of panel display known or developed in the art. Game display 540 may be mounted in either a "portrait" or "landscape" orientation and be of standard or "widescreen" dimensions (i.e., a ratio of one dimension to another of at least 16×9). For example, a widescreen display may be 32 inches wide by 18 inches tall. A widescreen display in a "portrait" orientation may be 32 inches tall by 18 inches wide. Additionally, game display 540 preferably includes a touch screen or touch glass system (not shown) and presents player interfaces such as, but not limited to, credit meter (not shown), win meter (not shown) and touch screen buttons (not shown). An example of a touch glass system is disclosed in U.S. Pat. No. 6,942,571, entitled "Gaming Device with Direction and Speed Control of Mechanical Reels Using Touch Screen," which is hereby incorporated by reference.

Game display 540 may also present information such as, but not limited to, player information, advertisements and casino promotions, graphic displays, news and sports updates, or even offer an alternate game. This information may be generated through a host computer networked with gaming machine 500 on its own initiative or it may be obtained by request of the player using either one or more of the plurality of player-activated buttons 560; the game display itself, if game display 540 comprises a touch screen or similar technology; buttons (not shown) mounted about game display 540 which may permit selections such as those found on an ATM machine, where legends on the screen are associated with respective selecting buttons; or any player input device that offers the required functionality.

Cabinet housing 520 incorporates a single game display 540. However, in alternate embodiments, cabinet housing 520 or top box 550 may house one or more additional displays or components used for various purposes including additional game play screens, animated "top glass," progressive meters or mechanical or electromechanical devices such as, but not limited to, wheels, pointers or reels. The additional displays may or may not include a touch screen or touch glass system.

Figure 6:
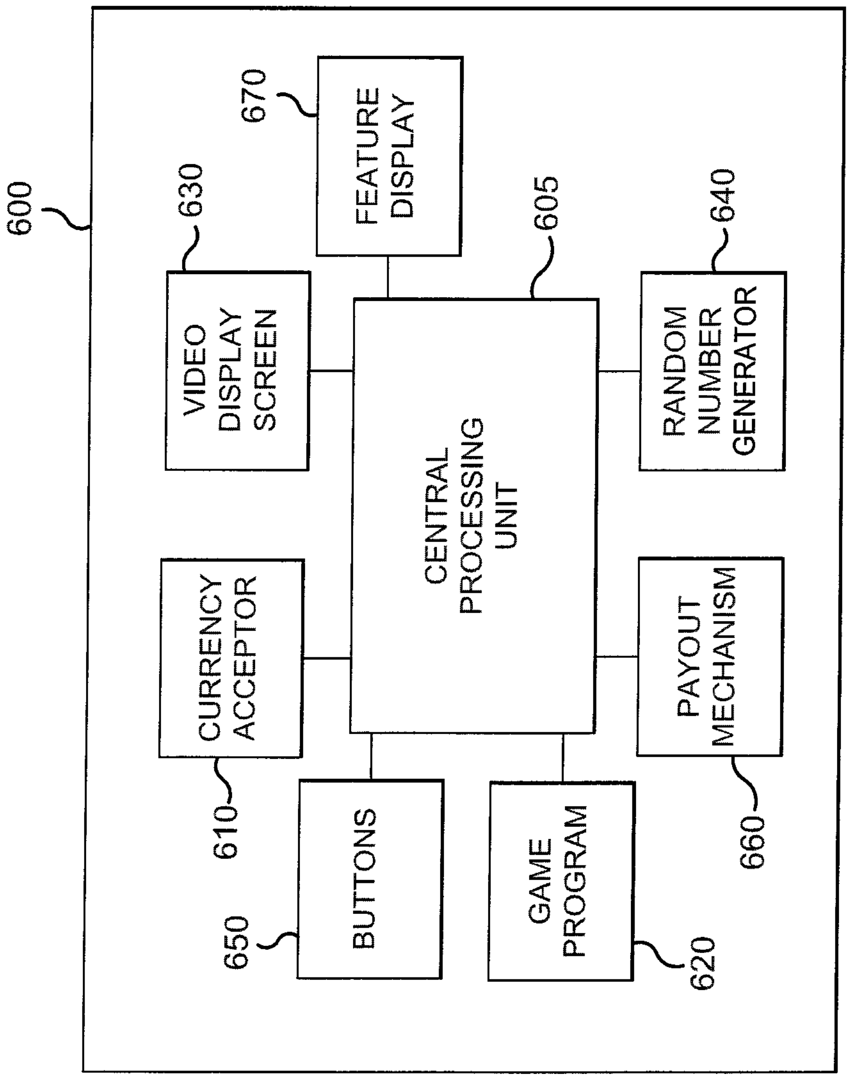
FIG. 6 is a block diagram of the physical and logical components of an example motherboard as may be implemented within the gaming machine of FIG. 5.

Referring to FIG. 6, a block diagram of an example gaming motherboard 600 is shown to include a functional interconnection of physical and logical components of gaming machine 500. Currency acceptor 610 is typically connected to a conventional central processing unit ("CPU") 605, such as an Intel Pentium microprocessor mounted on a gaming motherboard, by a serial connection such as RS-232 or USB. The gaming motherboard may be mounted with other conventional components, such as are found on conventional personal computer motherboards, and loaded with a gaming machine operating system (OS), such as an Alpha OS installed within a Bally S9000, M9000 or CineVision™ slot machine. CPU 605 executes game program 620 that causes video display 630 to display a game.

When a player has inserted a form of currency such as, for example and without limitation, paper currency, coins or tokens, cashless tickets or vouchers, electronic funds transfers or the like into currency acceptor 610, a signal is sent to CPU 605 which, in turn, assigns an appropriate number of credits for play. The player may further control the operation of gaming machine 600, for example, to select the amount to wager via electromechanical or touchscreen buttons 650. The game starts in response to the player pushing one of buttons 650 or an alternate start mechanism, for example, a handle or touch screen button. Random number generator 640 responds to instructions from CPU 605 to provide a display of randomly selected indicia on video display screen 630. Thereafter, the player may or may not interact with the game through electromechanical or touchscreen buttons 650 to change the displayed indicia. Finally, CPU 605 under control of game program 620 compares the final display of indicia to a pay table. The set of possible game outcomes may include a subset of outcomes related to the triggering of a feature game. In the event the displayed outcome is a member of this subset, CPU 605, under control of game program 620, causes additional game play to be presented on video display screen 630 as described above.

Predetermined payout amounts for certain outcomes, including feature game outcomes, are stored as part of game program 620. Such payout amounts are, in response to instructions from CPU 605, provided to the player in the form of coins, credits or currency via payout mechanism 660, which may be one or more of a credit meter, a coin hopper, a voucher printer, an electronic funds transfer protocol or any other payout means known or developed in the art.

In some embodiments of gaming motherboard 600, game program 620 is stored in a memory device (not shown). By way of example, but not by limitation, such memory devices include external memory devices, hard drives, CD-ROMs, DVDs, and flash memory cards. In an alternative embodiment, the game programs are stored in a remote storage device. In one embodiment, the remote storage device is housed in a remote server. The gaming machine may access the remote storage device via a network connection, including but not limited to, a local area network connection, a TCP/IP connection, a wireless connection, or any other means for operatively networking components together. Optionally, other data including graphics, sound files and other media data for use with gaming motherboard 600 are stored in the same or a separate memory device (not shown).

Figure 7:
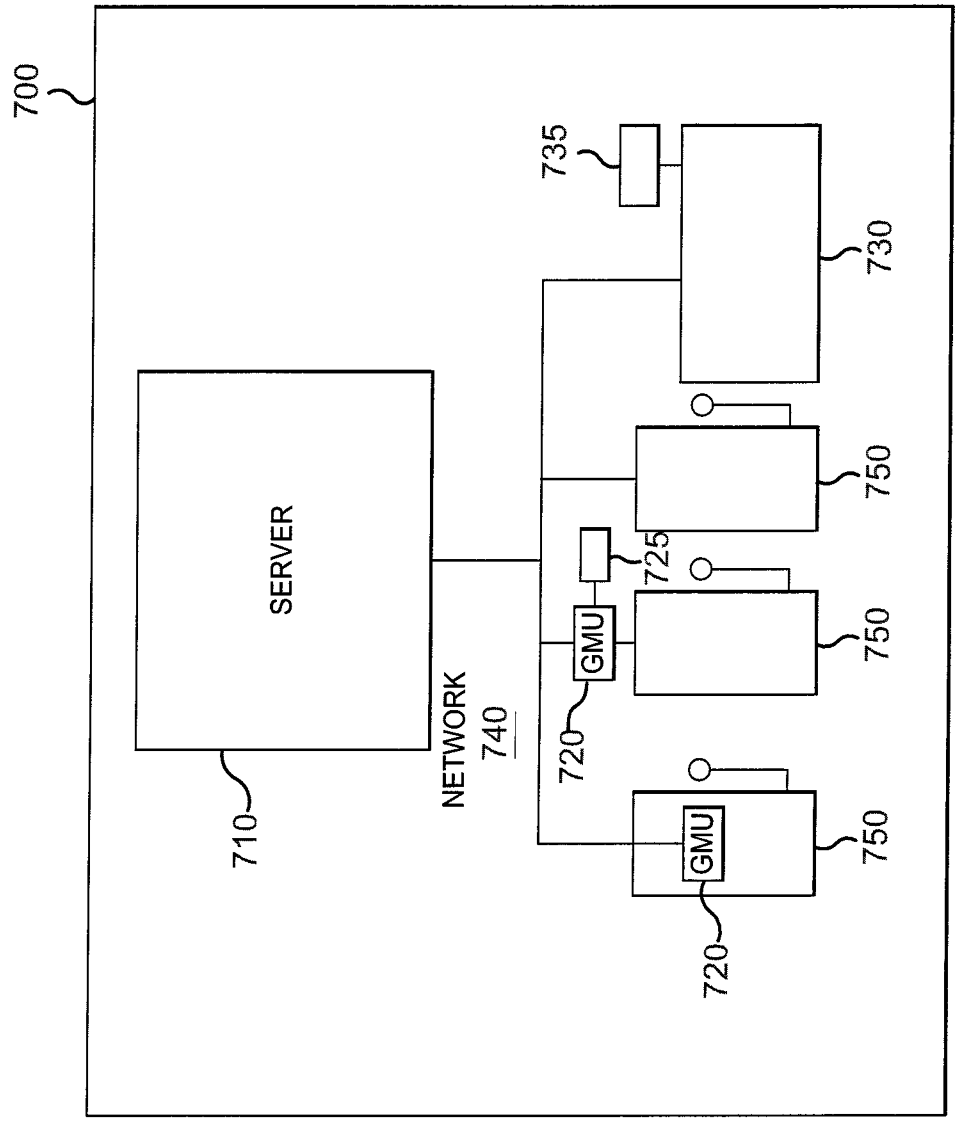
FIG. 7 is an example schematic block diagram showing the hardware elements of a networked gaming system in accordance with one or more aspects of the present invention.

Referring to FIG. 7, in accordance with one aspect of the invention, gaming system 700 includes host computer or server 710, gaming machines 750, and network 740 connecting gaming machines 750 to server 710. Additionally, gaming display computer 730 is shown connected to network 740. Server 710 may be selected from a variety of conventionally available servers. The type of server used is generally determined by the platform and software requirements of the gaming system. Examples of suitable servers are an IBM RS6000-based server, an IBM AS/400-based server or a Microsoft Windows-based server, but it should be appreciated that any suitable server may be used. It may also be appreciated that server 710 may be configured as a single "logical" server that comprises multiple physical servers. Gaming machines 750 operate similar to conventional peripheral networked terminals. Gaming machines 750 have a player interface such as a display, a card reader, and selection buttons through which gaming machines 750 interact with a player playing a wagering game with a randomly selected feature game in accordance with various embodiments of the invention. The player interface is used for making choices such as the amount of a bet or the number of lines to bet. Gaming machines 750 also provide information to server 710 concerning activity on gaming machines 750 and provide a communication portal for players with server 710. For example, the player interface may be used for selecting different server-related menu options such as, but not limited to, transferring a specified number of credits from a player account onto the credit meter of the gaming machine, or for transferring credits from the gaming machine to a central player account.

In various embodiments, any of the gaming machines 750 may be a mechanical reel spinning slot machine, video slot machine, video poker machine, keno machine, video blackjack machine, or a gaming machine offering one or more primary games including a randomly selected feature game in accordance with one or more embodiments of the invention. Networking components (not shown) facilitate communications across network 740 between the system server 710 and game management units 720 and/or gaming display control computers 730 that control displays for carousels of gaming machines. Game management units (GMU's) 720 connect gaming machines to networking components and may be installed in the gaming machine cabinet or external to the gaming machine. The function of the GMU is similar to the function of a network interface card connected to a desktop personal computer (PC) and it may contain tracking software which provides notification to the casino of certain events on a gaming machine 750, including wins. These events may be associated with a player account to determine a player tracking status, such as a bronze player, a silver player or a gold player, with each player tracking status level associated with varying eligibility for promotional or other awards including varying game play characteristics. Depending upon the casino management system, payouts on large wins at gaming machines 750 may be made directly to a player account managed by the host computer; in which case, the player is notified by way of the GMU at gaming machine 750 that the player's account has been credited.

Some GMU's have much greater capability and can perform such tasks as presenting and playing a game having a randomly selected feature game using a display 725 operatively connected to GMU 720. In one embodiment, GMU 720 is a separate component located outside the gaming machine. Alternatively, in another embodiment, the GMU 720 is located within the gaming machine. Optionally, in an alternative embodiment, one or more gaming machines 750 connect directly to the network and are not connected to a GMU 720. Displays related to games offering a randomly selected feature game on gaming machines 750 or GMU displays 725 may also be presented on gaming display 735 by gaming display control computer 730. An example of a display control computer is disclosed in U.S. application Ser. No. 11/463,793, entitled "Reconfigurable Gaming Display and System," filed on Aug. 10, 2006, which is hereby incorporated by reference in its entirety.

A gaming system of the type described above also allows a plurality of games in accordance with the various embodiments of the invention to be linked under the control of server 710 for cooperative or competitive play in a particular area, carousel, casino or between casinos located in geographically separate areas.

One will appreciate that a gaming system may also comprise other types of components, and the above illustrations are meant only as examples and not as limitations to the types of components or games having a randomly selected feature game. Additionally, it may further be appreciated that each of the games could be operated on a remote host computer such that a player initiates play with the host computer over a network via the player interface and gaming machine 750 operates the respective gaming and video displays in conjunction with the game whose play is controlled by the remote computer.

The various embodiments described above are provided by way of illustration only and should not be construed to limit the invention. For example, the availability of the feature games for play may be restricted based on the size or nature of the player's wager. In some embodiments, each feature game may not be associated with a primary game trigger, but may be one of a set of primary games randomly selected for play following initiation of play by the player. For example, multiple primary games are disclosed in U.S. application Ser. No. 11/428,220, entitled "Multiple Primary Games Triggered by Random Number Generator," filed on Jun. 30, 2006, which is hereby incorporated by reference, in which a gaming machine has at least two distinct primary games. After receiving a wager, the gaming machine determines which primary game to activate. The selected primary game is activated and a game outcome is presented to the player on a game display. A payout may be awarded according to the game outcome. The availability of the game may be restricted based on the size of the wager. A game in accordance with one or more aspects of the invention may be associated with a table game such a poker or blackjack. For example, a player may receive a chance to play a randomly selected feature game on a gaming machine located adjacent to a gaming table as a result of a hand of cards dealt to him during play of the table game.

Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed:

1. A wagering game for a gaming machine and playable by a player, the gaming machine comprising a non-transitory memory device and a processor, the game comprising:

a primary game including a set of possible outcomes executed by the processor under control of instructions stored in the non-transitory memory device and a plurality of three or more feature games executable by the processor under control of instructions stored in the non-transitory memory device, wherein two or more of the plurality of feature games are randomly selected for play upon the occurrence of a single triggering event, wherein display of each of the selected two or more feature games is distinct and independent from display of the first game in an order based at least in part on a potential award value of each of the two or more selected feature games.

2. The wagering game of claim 1 wherein the triggering event comprises one or more of the set of possible outcomes.

3. The wagering game of claim 1 wherein the triggering event is unrelated to the set of possible outcomes.

4. The wagering game of claim 1 wherein there is an equal probability of randomly selecting any one of the feature games for play.

5. The wagering game of claim 1 wherein there is an unequal probability of randomly selecting any one of the feature games for play.

6. The wagering game of claim 1 wherein the random selection of one of more of the plurality of feature games is at least partially influenced by an amount wagered by the player, a player tracking status of the player or a combination thereof.

7. The wagering game of claim 1 wherein each randomly selected two or more of the plurality of feature games is played a single time.

8. The wagering game of claim 1 wherein each randomly selected two or more of the plurality of feature games is played a multiple times.

9. The wagering game of claim 8 wherein the number of times each selected feature game is played is predetermined.

10. The wagering game of claim 8 wherein the number of times each selected feature game is played is randomly determined.

11. The wagering game of claim 8 wherein an external controller predetermines the number of times each selected feature game is played.

12. The wagering game of claim 8 wherein an external controller randomly determines the number of times each selected feature game is played.

13. The wagering game of claim 8 wherein the number of times each selected feature game is played is at least partially determined by an amount wagered on the game, a rate of play of the game, a player tracking status of the player or a combination thereof.

14. The wagering game of claim 1 further comprising a wager, wherein an award payable to the player is scaled according to the wager.

15. The wagering game of claim 14 further comprising a displayable pay table, wherein the displayed pay table changes dynamically according to the size of the wager.

16. The wagering game of claim 1 further comprising a plurality of progressive awards associated with the game.

17. The game of claim 16 wherein the progressive awards comprise at least one type of progressive including a wide-area progressive, casino-wide progressive, bank progressive, stand-alone progressive, or a combination thereof.

* * * * *